Patented Mar. 21, 1944

2,344,785

UNITED STATES PATENT OFFICE 2,344,785

PHOTOPOLYMERIZATION METHOD

James S. Owens, Lancaster, Pa., and Jacob Heerema and George W. Stanton, Midland, Mich., assignors to The Dow Chemical Company, Midland, Mich., a corporation of Michigan No Drawing. Application August 3, 1940, Serial No. 351,228

13 Claims. (Cl. 204—158)

This invention concerns an improved method of catalytically polymerizing vinyl and vinylidene compounds, i. e. compounds containing the radical:

A co-pending application of J. W. Britton and R. C. Dosser, Serial No. 351,220, filed concurrently herewith, discloses that the polymerization of vinyl and vinylidene compounds such as vinyl chloride, vinylidene chloride, vinyl cyanide, vinyl acetate, etc., may be accelerated by the presence of a complex catalyst consisting essentially of a peroxygen compound capable of supplying nascent oxygen to the reaction mixture and a ferric, chromium, uranium, or an aluminum compound. It discloses that the rate of polymerization may be further accelerated by having an acid present in amount sufficient to render the mixture distinctly acidic, e. g., to reduce the pH value of the mixture to below 6 and preferably to between 1.5 and 3. In said co-pending application it is shown that such complex catalyst is far more active than any of its ingredients in promoting the thermal polymerization of such compounds; i. e. the complex catalyst acts as a unitary catalyst which is superior to the ingredients of which it is composed. The co-pending application also shows that the kinds of acid, per-oxygen compound, and ferric, chromium, uranium or aluminum compound making up the complex catalyst are of minor importance, provided that the catalytic mixture of said ingredients is soluble in, or miscible with, the reaction mixture.

We have now discovered that when a polymerization of a vinyl or vinylidene compound in the presence of such complex catalyst is carried out under exposure to actinic light, the polymerization occurs far more rapidly than when carried out in the dark using the complex catalyst or when carried out under exposure to light, but in the absence of the complex catalyst. In fact, in all instances tested, the rate of polymerization when operating with the complex catalyst under exposure to light was greater than the sum of the rates obtained in comparative experiments carried out under similar conditions except: (1) using light alone, i. e. omitting the complex catalyst, in one experiment, and (2) employing the complex catalyst but omitting the light in another experiment. The exact cause of this phenomenon is not known. It seems probable that light not only directly catalyzes the polymerization, but, more important, that it strongly promotes, i. e. activates, the complex chemical catalyst and increases its effectiveness in promoting the reaction.

We have further found, when catalyzing the polymerization of vinyl and vinylidene compounds by the co-action of light and a complex chemical catalyst of the type above-mentioned which contains an iron compound as a catalytic ingredient, the the rate of polymerization increased as the proportions of iron compound and per-oxygen compound in the mixture was increased, until a point was reached beyond which a further increase in the proportions of iron and/or per-oxygen compound in the mixture caused a decrease in the rate of polymerization. However, we have further found that the active life of the catalyst becomes shorter as the catalytic action is thus increased and that when operating under conditions which give the greatest catalytic activity, i. e. which cause most rapid polymerization, the reaction may cease, due to exhaustion or de-activation of the catalyst, before the polymerization is complete. For this reason, we usually prefer to employ in the reaction mixture proportions of iron compound and per-oxygen compound somewhat below those which cause the polymerization to occur at maximum rate, in order to assure continuance of the catalytic action until the polymerization is completed. It may be mentioned that when operating under exposure to light in accordance with the invention, this ratio between the iron compound in the complex catalyst and the vinyl or vinylidene compound to be polymerized may be much higher than when operating under otherwise similar conditions, but in the absence of light.

We have also found that the catalytic conditions required by the invention influence the properties of the polymeric products. For instance, in polymerizing vinyl chloride in accordance with the invention, we have noted that as the catalytic action was intensified and the rate of polymerization thereby increased, there occurred a simultaneous decrease in the molecular weight and the viscosity of the polymeric product. Thus by change in the intensity of the catalysis the molecular weight and the properties of the polymeric product may be modified.

Examples of vinyl and vinylidene compounds which may be polymerized in accordance with the invention are vinyl chloride, vinyl bromide, vinylidene chloride, vinylidene bromide, vinyl acetate, vinyl cyanide, ethyl acrylate, methyl methacrylate, etc. Also, the invention may be applied in preparing resinous co-polymers by the co-polymerization of such compounds. In fact, the preparation of co-polymers of vinylidene chloride with other vinylidene or vinyl compounds, e. g. vinyl chloride, ethyl acrylate, methyl methacrylate, vinyl acetate, or vinyl cyanide, etc., constitutes an especially valuable and a preferred species of the invention.

As hereinbefore explained, the invention requires the polymerization of such compounds under exposure to actinic light and in the presence of a complex chemical catalyst comprising a per-oxygen compound capable of providing nascent oxygen during the polymerization, and a metal compound selected from the class consisting of iron, chromium, uranium and aluminum compounds. An acid in amount sufficient to acidify the mixture is also preferably employed, but is not in all instances required.

The light used in the process contains ultraviolet light, preferably of intensity greater than that of ordinary daylight in the northern part of the United States, although daylight may be used. Light of satisfactory quality may be obtained from a mercury electrode arc lamp, a carbon electrode arc lamp, or a filament type of electric lamp.

As hereinbefore indicated, the complex chemical catalyst contains a compound of one of the metals iron, chromium, uranium, and aluminum. The compound employed should of course be capable of being dissolved or readily dispersed in the reaction mixture. Examples of suitable metal compounds are the chlorides, nitrates, sulphates, acetates, benzene-sulphonates, etc., of iron, chromium, uranium, and aluminum and mixtures of such compounds of two or more of the metals. In general, iron compounds are preferred, since they may be employed in extremely small proportion to obtain a strong catalytic action. This is advantageous in that it permits acceleration of the polymerization without possibility of appreciably contaminating the polymeric product with a metal. Furthermore, iron compounds are far more effective as catalyst ingredients than are compounds of the other metals in promoting the polymerization of certain polymerizable organic compounds. However, iron compounds, if used in greater than catalytic amount, e. g. in amount such that their iron content corresponds to 1 per cent or more of the weight of the vinyl or vinylidene compound under treatment, is liable to inhibit, instead of promote, the polymerization. When using a uranium compound instead of an iron compound as an ingredient of the catalyst, care should also be taken to employ the uranium compound in small proportion, since the presence of a substantial proportion of a uranium compound in the reaction mixture may inhibit, instead of promote, the reaction. No such tendency has been observed when employing substantial proportions of compounds of chromium of aluminum in the catalyst, and compounds of these metals may in some instances be preferred. A mixture of compounds of two or more of the metal iron, chromium, uranium, and aluminum may, of course, be used in the complex catalyst.

As the per-oxygen compound to be used in the complex catalyst we prefer hydrogen peroxide, since it is inexpensive and satisfactory. However, other per-oxygen compounds such as per-benzoic acid, benzoyl peroxide, per-acetic acid, sodium or potassium perborate, sodium or potassium persulphate, etc., may be used.

Examples of acids which may be used as ingredients of the catalysts are nitric acid, hydrochloric acid, sulphuric acid, acetic acid, chloroacetic acid, etc. Nitric acid is in most instances, preferred. However, when polymerizing a readily hydrolyzable compound, such as vinyl acetate, a weaker acid, e. g. acetic acid, may advantageously be used. The acid is used in amount sufficient to reduce the pH value of the polymerization mixture to below 6, preferably to between 1.5 and 3. Although the presence of an acid usually accelerates the catalytic polymerization, the latter may frequently be carried out smoothly and rapidly without addition of the acid. Accordingly, the acid is a desirable, but not in all instances essential, ingredient of the complex catalyst.

The proportions of peroxide and of the catalytic metal compound in the polymerization mixture may be varied widely and still obtain satisfactory catalysis of the reaction. However, when using a complex catalyst containing an iron or a uranium compound, care should be taken to employ the metal compound in small proportion relative to the vinyl or vinylidene compound present. An iron compound is used in a proportion not greatly exceeding that necessary to co-act with the other catalytic agents, particularly the peroxide, since the presence of an excess of the iron compound may interfere with the reaction. The mixture should contain sufficient peroxide to co-act in catalytic manner with most and preferably all of the iron compound present and the use of excess peroxide over that required to co-act with the iron compound is desirable. The upper limits to the amounts of iron compound and of peroxide which may satisfactorily be used cannot definitely be fixed, since they vary somewhat depending upon the vinyl or vinylidene compound being polymerized. However, we usually employ not more than 0.2 mole of peroxide per mole of vinyl or vinylidene compound or compounds to be polymerized and not more than 0.03 gram atom of iron (in the iron compound) per mole of the peroxide. We preferably employ between 0.01 and 0.08 gram mole of peroxide per gram mole of the polymerizable compound and between 0.0001 and 0.01 gram atom of iron per gram mole of peroxide. As hereinbefore mentioned, the catalyst has a longer life when the proportion of iron compound is somewhat lower than that causing the greatest catalytic activity. The iron compound and the peroxide may be used in proportions considerably lower than those just given, e. g. the presence of a mere trace of an iron compound together with the other catalytic agents above mentioned, suffices to form a strongly active catalyst.

When using a uranium compound in the complex catalyst, it is employed in small proportion relative to the vinyl or vinylidene compound to be polymerized. The uranium compound and peroxide ingredients of the catalyst may be used in any desired proportions relative to one another, provided that sufficient peroxide is present to promote the polymerization. The uranium compound is usually employed in a proportion such that the reaction mixture contains about 0.00001 gram atom of uranium per mole of vinyl or vinylidene compound, but it may be used in greater or smaller proportions if desired.

The above restrictions on the proportions of peroxide and metal compound apply only when the metal compound in the complex catalyst is is an iron or a uranium compound. A chromium or an aluminum compound, when used in the complex catalyst, is preferably employed in a proportion such that its metal content corresponds to between 0.05 and 1 per cent of the weight of the organic compound to be polymerized. However, it may be used in smaller or in considerably larger proportion if desired, e. g. in a proportion such that its metal content corresponds to 2 per cent or more of the weight of the polymerizable compound. When using a chromium, uranium, or aluminum compound in the complex catalyst the proportion of peroxide in such catalyst may also be varied widely. Compounds of these metals may be employed in proportions exceeding those required to co-act catalytically with the peroxide without inhibiting the polymerization.

The photo-polymerization of a vinyl or vinylidene compound in the presence of the complex chemical catalyst just described, occurs most favorably when carried out in the presence of an inert liquid medium which serves as a mutual solvent for the polymerizable compound and the catalyst, but it may in some instances be carried out satisfactorily under other conditions, e. g. in the absence of a medium or in aqueous emulsion. Examples of solvents which may be employed as mediums for the reaction are methanol, ethanol, propanol, butanol, acetone, dioxane, etc., or aqueous solutions of such solvents. The solvent may be used in any desired proportion, provided that sufficient is employed to form a mutual solution of the catalyst and the compound to be polymerized.

The catalytic polymerizations with light and the complex catalyst usually occur smoothly at temperatures between 20° and 100° C. Lower or higher temperatures, e. g. −10° C. or 150° C. or higher, may in some instances be used. The polymerization is preferably carried out in a closed reactor or in contact with an inert atmosphere such as nitrogen or carbon dioxide.

During such catalytic polymerization of a vinyl or vinylidene compound in solution, the polymeric product frequently separates from the solution as it is formed. If such spontaneous separation of the polymer does not occur, the product is recovered in other ways, e. g. by adding water to cause its precipitation when a water-soluble solvent has been employed as the reaction medium, or by evaporating the solvent from the reacted mixture. The product is usually washed with water, acetone, or other suitable solvent and dried.

The following examples describe certain ways in which the principle of the invention has been applied, but are not to be construed as limiting its scope.

EXAMPLE 1

A series of experiments were carried out to determine the relative effectiveness of the complex chemical catalyst alone, of light alone, and of light in conjunction with the complex catalyst in promoting polymerizations. Certain of the tests were carried out in solution, using aqueous methanol of approximately 85 per cent by volume concentration as a reaction medium. Other experiments were carried out in aqueous emulsion and still others were carried out in the absence of any solvent other than the vinyl or vinylidene compound itself. The following table indicates the medium employed in carrying out each experiment. Each vinyl or vinylidene compound was subjected to three comparative tests, i. e. in separate experiments carried out under otherwise similar conditions it was polymerized using as the catalyst: the complex catalyst alone, light alone, and light in conjunction with the complex catalyst. The light used in all of the photo-polymerizations was of constant quality and was rich in ultra-violet light. It was supplied by a 360 watt mercury vapor arc lamp located about 30 centimeters from the reaction mixtures. The experiments wherein the reaction was promoted with the complex chemical catalyst alone were, of course, carried out in the dark. The complex chemical catalyst consisted of hydrogen peroxide in amount corresponding to 0.065 per cent of the weight of the entire reaction mixture, nitric acid in amount corresponding to 0.125 per cent of the weight of the mixture and ferric chloride in amount corresponding to 0.0004 per cent of the weight of the mixture. In each experiment carried out using a solution of the polymerizable compound and said chemical catalyst, the polymerizable compound together with the catalyst was dissolved in an approximately equal weight of 85 per cent concentrated methanol. In those experiments carried out in aqueous emulsion using said catalyst, the vinyl or vinylidene compound named was agitated with an aqueous solution of the catalyst and Nopco (a sodium salt of sulphonated sperm oil) until emulsification occurred. The emulsion contained the catalytic agents in amounts above stated and approximately 5 per cent by weight of Nopco. In the experiments carried out without a medium, but using the chemical catalyst, the latter was admixed directly with the compound to be polymerized. All polymerizations were carried out at a temperature of 20° C. In each experiment the rate of polymerization was determined. The table names the vinyl or vinylidene compound used in each experiment; states whether the polymerization was carried out in solution, in emulsion, or without use of an added medium; and gives the rate of polymerization as per cent of the vinyl or vinylidene compound employed which was polymerized per hour.

*Table I*

| Run No. | Polymerizable compound | Nature of run | Catalyst | Polymerization rate, per cent per hour |
|---|---|---|---|---|
| 1 | Vinyl chloride | Solution | Light | 0 |
| 2 | do | do | Complex catalyst | 0.14 |
| 3 | do | do | Light+complex catalyst | 13.2 |
| 4 | Vinylidene chloride | Solution | Light | 0.13 |
| 5 | do | do | Complex catalyst | 0.009 |
| 6 | do | do | Light+complex catalyst | 2.9 |
| 7 | Vinyl cyanide | Solution | Light | 0 |
| 8 | do | do | Complex catalyst | 0 |
| 9 | do | do | Light+complex catalyst | 14.2 |
| 10 | Vinyl acetate | Solution | Light | 0 |
| 11 | do | do | Complex catalyst | 0 |
| 12 | do | do | Light+complex catalyst | 7.2 |

Table I—Continued

| Run No. | Polymerizable compound | Nature of run | Catalyst | Polymerization rate, per cent per hour |
|---|---|---|---|---|
| 13 | Styrene | Solution | Light | Trace |
| 14 | do | do | Complex catalyst | 0.06 |
| 15 | do | do | Light+complex catalyst | 0.83 |
| 16 | Ethyl acrylate | Solution | Light | 0 |
| 17 | do | do | Complex catalyst | 0 |
| 18 | do | do | Light+complex catalyst | 50.4 |
| 19 | 20% by wt. vinyl chloride / 80% by wt. vinylidene chloride | Solution | Light | 0.2 |
| 20 | 20% by wt. vinyl chloride / 80% by wt. vinylidene chloride | do | Complex catalyst | 0 |
| 21 | 20% by wt. vinyl chloride / 80% by wt. vinylidene chloride | do | Light+complex catalyst | 2.7 |
| 22 | Vinylidene chloride | Emulsion | Light | 0.52 |
| 23 | do | do | Complex catalyst | 1.09 |
| 24 | do | do | Light+complex catalyst | 5.9 |
| 25 | Vinyl cyanide | Emulsion | Light | 2.68 |
| 26 | do | do | Complex catalyst | 1.09 |
| 27 | do | do | Light+complex catalyst | 20.4 |
| 28 | Vinyl cyanide | No medium | Light | 0 |
| 29 | do | do | Complex catalyst | 0 |
| 30 | do | do | Light+complex catalyst | 0.95 |
| 31 | Styrene | No medium | Light | 0.05 |
| 32 | do | do | Complex catalyst | 0 |
| 33 | do | do | Light+complex catalyst | 0.27 |

EXAMPLE 2

In each of a series of experiments the respective polymerizable compound or compounds indicated in Table II were dissolved in an equal weight of aqueous methanol of 85 per cent by volume concentration and the resultant solution was treated with 0.6 per cent by weight of hydrogen peroxide, 0.005 per cent of ferric chloride and 0.125 per cent of concentrated nitric acid. Polymerization was effected by warming the solutions so-prepared at 45° C. while exposing them to ultra-violet light of the same intensity. Samples of material were withdrawn at regular intervals of time and the extent and rate of polymerization determined. Table II names the polymerizable compounds used in the experiments and gives the proportion of each as per cent of the total weight of the polymerizable compounds initially present. The table also gives the rate of polymerization in each instance as per cent by weight of the polymerizable compounds initially employed which underwent polymerization per hour.

Table II

| Test No. | Polymerizable compounds | | Polymerization rate, per cent |
|---|---|---|---|
| | Kinds | Per cent | |
| 1 | Vinylidene chloride | 100 | 15 |
| 2 | Vinylidene chloride / Ethyl acrylate | 95 / 5 | 15 |
| 3 | Vinilidene chloride / Vinyl cyanide | 95 / 5 | 14.5 |
| 4 | Vinylidene chloride / Vinyl acetate | 95 / 5 | 13.6 |
| 5 | Vinylidene chloride / Vinyl chloride | 95 / 5 | 12.5 |
| 6 | Vinylidene chloride / Methyl methacrylate | 95 / 5 | 11.2 |

EXAMPLE 3

A number of solutions were prepared, each containing approximately 10 per cent by weight of vinyl chloride, 40 per cent of vinylidene chloride, 42 per cent of methanol, 7.5 per cent of water, 0.3 per cent of hydrogen peroxide, 0.015 per cent of ferric chloride, and sufficient nitric acid to reduce its pH value to about 2. Based on the combined weight of vinyl chloride and vinylidene chloride present, these solutions contained 0.6 per cent by weight of hydrogen peroxide and 0.03 per cent of ferric chloride. Another series of solutions were prepared, each containing approximately 10 per cent by weight of vinyl chloride, 40 per cent of vinylidene chloride, 42 per cent of methanol, 7.5 per cent of water, 0.6 per cent of hydrogen peroxide, 0.005 per cent of ferric chloride and sufficient nitric acid to reduce its pH value to about 2. Based on the combined weight of vinyl chloride and vinylidene chloride present this latter series of solutions contained 1.2 per cent by weight of hydrogen peroxide and 0.01 per cent of ferric chloride. All of the solutions were heated in closed containers at a temperature of 45° C. under exposure to light from a 360 watt mercury vapor arc lamp placed equidistance therefrom. At regular intervals of time a sample of material from each series of tests was withdrawn and the extent of polymerization was determined. It was found that the solutions which initially contained 0.6 per cent of hydrogen peroxide and 0.03 per cent of ferric chloride, based on the weight of polymerizable compounds present, polymerized at a rate of 14.5 per cent of the initial weight of the polymerizable compounds per hour until the polymerization was approximately 33 per cent complete. Thereafter the rate of polymerization dropped sharply to only about 1 per cent of the initial weight of the polymerizable compounds per hour, indicating that the catalyst had become de-activated. In contrast, the solutions which initially contained 1.2 per sent of hydrogen peroxide and 0.01 per cent of ferric chloride, based on the combined weight of polymerizable compounds present, underwent polymerization at a nearly constant rate of 10 per cent of the initial weight of the polymerizable compounds per hour until the polymerization was 75 per cent complete. From these results it will be seen that it sometimes is advantageous to employ the complex catalyst ingredients in proportions which cause somewhat less than the maximum rate of polymerization attainable with such catalyst, since the slight sacrifice in catalytic activity is compensated for by a marked increase in the life of the catalyst.

EXAMPLE 4

A solution containing 10 parts by weight of vinyl chloride, 40 parts of vinylidene chloride, 42.5 parts of methanol, and 7.5 parts of water was divided into three portions. The separate portions were treated with hydrogen peroxide and ferric chloride in the respective amounts indicated in the following table and with sufficient nitric acid to reduce the pH value to about 2. Two of the resultant solutions were heated to 45° C. in closed containers under exposure to ultra-violet light of the same intensity. The other solution was also heated in a closed container to 45° C., but in the absence of light. Heating of the respective solutions under the conditions just given was continued until 75 per cent by weight of the mixture of vinyl chloride and vinylidene chloride in each solution had been polymerized. The time required to complete each polymerization to this point was noted. The polymerized products were separated, washed with water and dried. The viscosity characteristics of the products were determined by dissolving 2 grams of each in 100 cubic centimeters of ortho-dichlorobenzene and determining the viscosity of the resultant solution at 120° C. Table III gives the proportions of hydrogen peroxide and of ferric chloride employed in each experiment, expressed as per cent of the combined weight of vinyl chloride and vinylidene chloride present, and indicates whether or not light was employed. The table also gives the time of heating at 45° C. in hours required to render each polymeriztaion 75 per cent complete and the absolute viscosity in centipoises at 120° C. of the respective solutions of the polymerized products in ortho-dichlorobenzene.

*Table III*

| Run No. | Catalytic conditions | | | Polymerization time, hours | Viscosity of soln. of polymer cps. |
|---|---|---|---|---|---|
| | $H_2O_2$, per cent | $FeCl_3$, per cent | Light used | | |
| 1 | 1.2 | 0.01 | Yes | 7.5 | 0.65 |
| 2 | 1.2 | 0.0003 | Yes | 15.3 | 0.77 |
| 3 | 0.6 | 0.03 | No | 21.5 | 0.71 |

The proportions of hydrogen peroxide and ferric chloride employed in Run 3 are those which give the maximum rate of polymerization when operating in the absence of light. From comparison of Run 2 with Run 3 of the table it will be seen that by the conjoint use of light and the complex catalyst, the polymerization may be carried out more rapidly to obtain a product of higher viscosity than is possible when operating at maximum polymerization rate in the presence of such complex catalyst, but in the absence of light. Run 1 of the table shows that by increasing the proportion of ferric chloride employed, the polymerization under light may be caused to occur more rapidly than in Run 2, but that such increase in the rate of polymerization is accompanied by a decrease in the viscosity characteristics of the product. It may be mentioned that the viscosity characteristics of the polymeric products are dependent upon, and approximately proportional to, the molecular weights of the polymers and that the physical and mechanical properties of the polymers vary with change in their molecular weights. It will be seen from the above data that during practice of the invention the molecular weights and properties of the polymeric products may be modified by change in the proportions of the catalyst ingredients, particularly the iron compound, employed to promote their formation.

Example 5

The purpose of this example is to present further data demonstrating the changes in rates of polymerization of vinyl and vinylidene compounds which result from changes in the proportions of peroxide and iron compound in the catalyst for the reaction. In each of a series of experiments, the polymerizable compounds named in the following table were dissolved in an equal weight of aqueous methanol of 85 per cent by volume concentration. Certain of the solutions were treated with hydrogen peroxide and ferric chloride in the proportions given in the table. All of the solutions were treated with sufficient nitric acid to reduce the pH value to about 2. The solutions were heated in a closed container at a temperature of 25° C. under exposure to light from a 360 watt mercury vapor arc lamp and the rates of polymerization during the earlier stages of the reaction, i. e. until the polymerizations were about 20 per cent complete, were determined as in Example 3. The table names the polymerizable compounds employed in each experiment and gives the proportion of each as per cent by weight of all polymerizable organic compounds present. It also gives the proportions of hydrogen peroxide and of ferric chloride employed, expressed as per cent of the weight of the polymerizable compounds.

The table expresses each rate of polymerization as per cent by weight of the polymerizable compounds initially employed which undergo polymerization per hour.

*Table IV*

| Run No. | Polymerizable compounds | | $H_2O_2$, per cent | $FeCl_3$, per cent | Polymerization rate per cent per hour |
|---|---|---|---|---|---|
| | Kinds | Per cent | | | |
| 1 | Vinyl chloride | 100 | 0 | 0 | Less than 1 |
| 2 | do | 100 | 0.006 | 0.0002 | 17 |
| 3 | do | 100 | 0.03 | 0.002 | 42 |
| 4 | do | 100 | 0.15 | 0.02 | 82 |
| 5 | do | 100 | 0.6 | 0.1 | 153 |
| 6 | do | 100 | 1.2 | 0.15 | 210 |
| 7 | do | 100 | 3.0 | 0.2 | 200 |
| 8 | Vinyl chloride / Vinylidene chloride | 20 / 80 | 0 | 0 | About 0.2 |
| 9 | Vinyl chloride / Vinylidene chloride | 20 / 80 | 0.03 | 0.0006 | 2.0 |
| 10 | Vinyl chloride / Vinylidene chloride | 20 / 80 | 0.15 | 0.004 | 3.8 |
| 11 | Vinyl chloride / Vinylidene chloride | 20 / 80 | 0.6 | 0.03 | 4.2 |
| 12 | Vinyl chloride / Vinylidene chloride | 20 / 80 | 1.5 | 0.1 | 4.1 |

Example 6

The purpose of this example is to show a number of instances wherein the invention has been applied using peroxygen compounds other than hydrogen peroxide, or chromium, uranium, and aluminum compounds instead of an iron compound, as ingredients of the complex catalyst. In each of a series of experiments, the polymerizable compound or compounds stated in the following table in the proportions also given were dissolved in an equal weight of aqueous methanol of 85 per cent by volume concentration. Each solution so-formed was treated with the peroxygen compound and the metal compound named in the table in the proportions given and with sufficient nitric acid to reduce the pH value of the solution to about 2. The solutions were then maintained at 20–25° C. under exposure to ultra-violet light of practically the same intensity and the rates of polymerization during the early stages of the reaction, i. e. up until the polymerizations were about 20 per cent complete, were determined as in Example 3. Table V names the polymerizable compounds employed in each experiment and gives the proportion of each as per cent of the total weight of the polymerizable compounds present. It also names the per-oxygen compound and the metal compound employed as catalyst ingredients and gives the proportion of each as per cent of the weight of polymerizable compounds employed. The table expresses the rate of polymerization in each experiment as per cent by weight of the polymerizable compounds employed which undergoes polymerization per hour. The table includes a number of experiments wherein the metal compound required by the invention as an ingredient of the catalyst was omitted. These experiments are submitted for purpose of comparison with other experiments in the table which were carried out in the presence of a metal compound under otherwise similar conditions.

*Table V*

| Run No. | Polymerizable compounds | | Catalyst ingredients | | | | Polymerization rate, per cent |
|---|---|---|---|---|---|---|---|
| | | | Per-oxygen compound | | Metal compound | | |
| | Kinds | Per cent | Kind | Per cent | Kind | Per cent | |
| 1 | Vinyl chloride | 100 | $H_2O_2$ | 0.15 | None | 0 | 4.8 |
| 2 | do | 100 | do | 0.15 | $AlCl_3.6H_2O$ | 0.46 | 6.4 |
| 3 | do | 100 | do | 0.15 | $Cr(NO_3)_3.9H_2O$ | 0.75 | 8.2 |
| 4 | do | 100 | do | 0.15 | $CrCl_3.6H_2O$ | 0.5 | 14.4 |
| 5 | do | 100 | do | 0.15 | $FeCl_3$ | 0.0064 | 49.8 |
| 6 | do | 100 | $NaBO_3.4H_2O$ | 0.65 | None | 0 | 5.33 |
| 7 | do | 100 | do | 0.65 | $FeCl_3$ | 0.03 | 32.8 |
| 8 | do | 100 | Benzoyl peroxide | 1.0 | None | 0 | 20.8 |
| 9 | do | 100 | do | 1.0 | $FeCl_3$ | 0.03 | 29.0 |
| 10 | Vinyl chloride / Vinylidene chloride | 20 / 80 | $K_2S_2O_8$ | 0.15 | None | 0 | 0.13 |
| 11 | Vinyl chloride / Vinylidene chloride | 20 / 80 | do | 0.15 | $FeCl_3$ | 0.01 | 2.9 |
| 12 | Vinyl chloride / Vinylidene chloride | 20 / 80 | $H_2O_2$ | 0.15 | None | 0 | 1.0 |
| 13 | Vinyl chloride / Vinylidene chloride | 20 / 80 | do | 0.15 | Uranyl acetate | 0.006 | 1.8 |

EXAMPLE 7

The purpose of this example is to show that when practising the invention using the complex catalyst in a form containing an iron compound, the latter may be introduced to the reaction mixture as a ferrous compound. Two vinyl chloride solutions were prepared by dissolving vinyl chloride in an equal weight of aqueous methanol of 85 per cent by volume concentration. Each solution was treated with hydrogen peroxide in amount corresponding to 0.15 per cent of the weight of the vinyl chloride present. The solutions were also treated with the respective iron compounds named in Table VI in the proportions also given and with sufficient nitric acid to reduce the pH value to about 2. The solutions were subjected to polymerization by maintaining them in a closed container at 25° C. under exposure to ultra-violet light of uniform intensity. The rates of polymerization during the early stages of the reaction were determined as in Example 3. Table VI names the iron compound employed in each experiment and gives its proportion as per cent of the weight of the vinyl chloride. The table expresses the rate of polymerization, i. e. the quantity of vinyl chloride polymerized per hour, as per cent by weight of the vinyl chloride employed.

*Table VI*

| Run No. | Iron compound | | Polymerization rate, per cent |
|---|---|---|---|
| | Kind | Per cent | |
| 1 | $FeCl_3$ | 0.006 | 62.7 |
| 2 | $FeCl_2.4H_2O$ | 0.007 | 109.0 |

It will be seen that the rate of polymerization was greater when the iron compound added to the reaction mixture was a ferrous compound than when it was a ferric compound.

Other modes of applying the principle of our invention may be employed instead of the one explained, change being made as regards the details herein disclosed, provided the step or steps stated by any of the following claims or the equivalent of such stated step or steps be employed.

We therefore particularly point out and distinctly claim as our invention:

1. In a method wherein at least one compound selected from the class consisting of vinyl and vinylidene compounds is polymerized in the presence of a peroxide, an acid in amount sufficient to give the mixture a pH value of less than 6, and an ionizable iron salt having the iron attached to acid radicals, the step of further accelerating the reaction by carrying it out under exposure to actinic light of a quality rich in ultraviolet light.

2. In a method wherein at least one compound selected from the class consisting of vinyl and vinylidene compounds is polymerized in the presence of a complex polymerization catalyst comprising an acid in amount sufficient to give the entire mixture a pH value of less than 6, hydrogen peroxide, and an ionizable iron salt having the iron attached to acid radicals, the step of further accelerating the reaction by exposing the mixture to actinic light of a quality rich in ultraviolet light.

3. The method which comprises forming a solution containing at least one polymerizable compound selected from the class consisting of vinyl and vinylidene compounds, an inert solvent for the polymerizable compound, a peroxide in amount not exceeding 0.2 of the molecular equivalent of the polymerizable compound, an ionizable iron salt having the iron attached to acid radicals, said iron salt being present in amount such as to contain not more than 0.03 gram atomic weight of iron per gram mole of the peroxide, and an acid in amount sufficient to reduce the pH value of the solution to below 6, and effecting polymerization by exposing the solution at a polymerizing temperature to actinic light of a quality rich in ultraviolet light.

4. The method which comprises forming a solution containing at least one polymerizable compound selected from the class consisting of vinyl and vinylidene compounds and also containing aqueous methanol, hydrogen peroxide in amount not exceeding 0.08 of the molecular equivalent of the polymerizable compound, an ionizable iron salt having the iron attached to acid radicals, said iron salt being present in amount such as to contain between 0.0001 and 0.01 gram atomic weight of iron per gram mole of the hydrogen peroxide, and an acid in an amount sufficient to reduce the pH value of the solution to between about 1.5 and about 3, and effecting polymerization by exposing the solution to actinic light of a quality rich in ultraviolet light while at a polymerizing temperature.

5. In a method wherein a vinyl halide is polymerized in the presence of a polymerization catalyst comprising an acid in amount sufficient to reduce the pH value of the mixture to below 6, a peroxide, and an ionizable iron salt having the iron attached to acid radicals, the step of further accelerating the polymerization by exposing the reaction mixture to actinic light of a quality rich in ultraviolet light.

6. In a method wherein vinyl chloride is polymerized in the presence of a polymerization catalyst comprising an acid in amount sufficient to reduce the pH value of the mixture to below 6, hydrogen peroxide, and an ionizable iron salt having the iron attached to acid radicals, the step of further accelerating the polymerization by exposing the reaction mixture to actinic light of a quality rich in ultraviolet light.

7. The method which comprises forming a solution containing vinyl chloride, aqueous methanol, hydrogen peroxide in amount not exceeding 0.2 of the molecular equivalent of the vinyl chloride, an ionizable iron salt having the iron attached to acid radicals, said iron salt being present in amount such as to contain not more than 0.03 gram atomic weight of iron per gram mole of hydrogen peroxide, and an acid in amount sufficient to reduce the pH value of the solution to below 6, and effecting polymerization by exposing the solution at a polymerizing temperature to actinic light of a quality rich in ultraviolet light.

8. In a method wherein vinylidene chloride is polymerized in the presence of a polymerization catalyst comprising a peroxide, an ionizable iron salt having the iron attached to acid radicals, and an acid in amount sufficient to reduce the pH value of the reaction mixture to below 6, the step of further accelerating the polymerization by exposing the reaction mixture to actinic light of a quality rich in ultraviolet light.

9. In a method wherein vinylidene chloride is polymerized in the presence of a polymerization catalyst comprising hydrogen peroxide, an ionizable iron salt having the iron attached to acid radicals, and an acid in amount sufficient to reduce the pH value of the reaction mixture to below 6, the step of further accelerating the polymerization by exposing the reaction mixture to actinic light of a quality rich in ultraviolet light.

10. The method which comprises forming a solution containing a vinylidene chloride, aqueous methanol, hydrogen peroxide in amount not exceeding 0.2 of the molecular equivalent of the vinylidene chloride, an acid in amount such as to reduce the pH value of the solution to below 6, and an ionizable iron salt having the iron attached to acid radicals, said iron salt being present in amount such as to contain not more than 0.03 gram atomic weight of iron per gram mole of the hydrogen peroxide, and effecting polymerization of the vinylidene chloride by exposing the solution to actinic light of a quality rich in ultraviolet light.

11. In a method wherein vinylidene chloride is copolymerized with another polymerizable unsaturated organic compound containing the radical

in the presence of a polymerization catalyst comprising an acid in amount sufficient to reduce the pH value of the mixture to below 6, a peroxide, and an ionizable iron salt having the iron attached to acid radicals, the step of further accelerating the rate of polymerization by exposing the reaction mixture to actinic light of a quality rich in ultraviolet light.

12. In a method for making a copolymer of vinylidene chloride and ethyl acrylate wherein a mixture of vinylidene chloride and ethyl acrylate is copolymerized in the presence of a peroxide, an ionizable iron salt having the iron attached to acid radicals, and an acid in amount sufficient to reduce the pH value of the mixture to below 6, the step of accelerating the polymerization by exposing the reaction mixture to actinic light of a quality rich in ultraviolet light.

13. The method which comprises forming a solution containing vinylidene chloride, ethyl acrylate, aqueous methanol, hydrogen peroxide in amount not exceeding 0.2 of the molecular equivalent of the vinylidene chloride plus the ethyl acrylate, an ionizable iron salt having the iron attached to acid radicals, said iron salt being present in amount such as to contain not more than 0.03 gram atomic weight of iron per gram mole of the hydrogen peroxide, and an acid in amount sufficient to reduce the pH value of the solution to below 6, and effecting polymerization by exposing the solution at a polymerizing temperature to actinic light of a quality rich in ultraviolet light.

JAMES S. OWENS.
JACOB HEEREMA.
GEORGE W. STANTON.